United States Patent
Takahashi et al.

(10) Patent No.: US 12,038,991 B2
(45) Date of Patent: *Jul. 16, 2024

(54) INTERACTIVE GEOGRAPHICAL MAP

(71) Applicant: Palantir Technologies Inc., Denver, CO (US)

(72) Inventors: Glen Takahashi, New York, NY (US); Robert Imig, Austin, TX (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,022

(22) Filed: Jun. 8, 2022

(65) Prior Publication Data
US 2022/0300572 A1    Sep. 22, 2022

Related U.S. Application Data

(63) Continuation of application No. 17/120,567, filed on Dec. 14, 2020, now Pat. No. 11,403,358, which is a
(Continued)

(51) Int. Cl.
*G06F 16/9537* (2019.01)
*G06F 16/20* (2019.01)
(Continued)

(52) U.S. Cl.
CPC .......... *G06F 16/9537* (2019.01); *G06F 16/20* (2019.01); *G06F 16/244* (2019.01);
(Continued)

(58) Field of Classification Search
None
See application file for complete search history.

(56) References Cited

U.S. PATENT DOCUMENTS 4,899,161 A   2/1990   Morin et al.
4,958,305 A   9/1990   Piazza
(Continued)

FOREIGN PATENT DOCUMENTS

AU   2012216622   5/2015
CA   2646117      6/2010
(Continued)

OTHER PUBLICATIONS

Official Communication for European Patent Application No. 19166099.2 dated Mar. 23, 2022, 10 pages.
(Continued)

*Primary Examiner* — Yu Zhao
(74) *Attorney, Agent, or Firm* — Knobbe, Martens, Olson & Bear, LLP

(57) ABSTRACT

The systems, methods, and devices of the present disclosure may provide, among other features, high-performance, interactive geographical and/or data object map capabilities in which large amounts of geographical, geospatial, and other types of data, geodata, objects, features, and/or metadata are efficiently presented to a user on a map interface. In various embodiments, an interactive geographical map display system may enable rapid and deep analysis of various objects, features, and/or metadata by the user by aggregating and clustering large sets of data into aggregate values and clusters. The user can select various clusters, via the user interface, to interact with the data, clusters, and map.

18 Claims, 10 Drawing Sheets

Related U.S. Application Data continuation of application No. 15/958,599, filed on Apr. 20, 2018, now Pat. No. 10,896,234.

(60) Provisional application No. 62/650,141, filed on Mar. 29, 2018.

(51) Int. Cl.

| | | |
|---|---|---|
| *G06F 16/242* | (2019.01) | |
| *G06F 16/248* | (2019.01) | |
| *G06F 16/28* | (2019.01) | |
| *G06F 16/29* | (2019.01) | |
| *G06F 16/338* | (2019.01) | |
| *G06F 16/35* | (2019.01) | |
| *G06F 16/387* | (2019.01) | |
| *G06F 16/58* | (2019.01) | |
| *G09B 29/00* | (2006.01) | |
| G06F 3/04842 | (2022.01) | |
| G06F 3/04845 | (2022.01) | |

(52) U.S. Cl.
CPC .......... *G06F 16/248* (2019.01); *G06F 16/287* (2019.01); *G06F 16/29* (2019.01); *G06F 16/338* (2019.01); *G06F 16/35* (2019.01); *G06F 16/387* (2019.01); *G06F 16/5866* (2019.01); *G09B 29/007* (2013.01); G06F 3/04842 (2013.01); G06F 3/04845 (2013.01); G06F 2203/04806 (2013.01)

(56) References Cited

U.S. PATENT DOCUMENTS

| | | | |
|---|---|---|---|
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 6,091,956 A | 7/2000 | Hollenberg | |
| 6,157,747 A | 12/2000 | Szeliski et al. | |
| 6,169,552 B1 | 1/2001 | Endo et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce et al. | |
| 6,414,683 B1 | 7/2002 | Gueziec | |
| 6,483,509 B1 | 11/2002 | Rabenhorst | |
| 6,529,900 B1 | 3/2003 | Patterson et al. | |
| 6,631,496 B1 | 10/2003 | Li et al. | |
| 6,662,103 B1 | 12/2003 | Skolnick et al. | |
| 6,757,445 B1 | 6/2004 | Knopp | |
| 6,828,920 B2 | 12/2004 | Owen et al. | |
| 6,983,203 B1 | 1/2006 | Wako | |
| 6,985,950 B1 | 1/2006 | Hanson et al. | |
| 7,036,085 B2 | 4/2006 | Barros | |
| 7,158,878 B2 | 1/2007 | Rasmussen et al. | |
| 7,375,732 B2 | 5/2008 | Arcas | |
| 7,379,811 B2 | 5/2008 | Rasmussen et al. | |
| 7,457,706 B2 | 11/2008 | Malero et al. | |
| 7,502,786 B2 | 3/2009 | Liu et al. | |
| 7,519,470 B2 | 4/2009 | Brasche et al. | |
| 7,529,195 B2 | 5/2009 | Gorman | |
| 7,539,666 B2 | 5/2009 | Ashworth et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,617,314 B1 | 11/2009 | Bansod et al. | |
| 7,620,628 B2 | 11/2009 | Kapur et al. | |
| 7,663,621 B1 | 2/2010 | Allen et al. | |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,872,647 B2 | 1/2011 | Mayer et al. | |
| 7,894,984 B2 | 2/2011 | Rasmussen et al. | |
| 7,899,611 B2 | 3/2011 | Downs et al. | |
| 7,920,963 B2 | 4/2011 | Jouline et al. | |
| 7,945,852 B1 | 5/2011 | Pilskains | |
| 7,962,281 B2 | 6/2011 | Rasmussen et al. | |
| 7,970,240 B1 | 6/2011 | Chao et al. | |
| 8,010,545 B2 | 8/2011 | Stefik et al. | |
| 8,036,632 B1 | 10/2011 | Cona et al. | |
| 8,065,080 B2 | 11/2011 | Koch | |
| 8,085,268 B2 | 12/2011 | Carrino et al. | |
| 8,134,457 B2 | 3/2012 | Velipasalar et al. | |
| 8,145,703 B2 | 3/2012 | Frishert et al. | |
| 8,200,676 B2 | 6/2012 | Frank | |
| 8,214,361 B1 | 7/2012 | Sandler et al. | |
| 8,214,764 B2 | 7/2012 | Gemmell et al. | |
| 8,229,947 B2 | 7/2012 | Fujinaga | |
| 8,230,333 B2 | 7/2012 | Decherd et al. | |
| 8,290,942 B2 | 10/2012 | Jones et al. | |
| 8,290,943 B2 | 10/2012 | Carbone et al. | |
| 8,301,464 B1 | 10/2012 | Cave et al. | |
| 8,325,178 B1 | 12/2012 | Doyle, Jr. | |
| 8,368,695 B2 | 2/2013 | Howell et al. | |
| 8,397,171 B2 | 3/2013 | Klassen et al. | |
| 8,400,448 B1 | 3/2013 | Doyle, Jr. | |
| 8,407,180 B1 | 3/2013 | Ramesh et al. | |
| 8,412,234 B1 | 4/2013 | Gatmir-Motahari et al. | |
| 8,412,707 B1 | 4/2013 | Mianji | |
| 8,422,825 B1 | 4/2013 | Neophytou et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,508,533 B2 | 8/2013 | Cervelli et al. | |
| 8,514,229 B2 | 8/2013 | Cervelli et al. | |
| 8,515,207 B2 | 8/2013 | Chau | |
| 8,564,596 B2 | 10/2013 | Carrino et al. | |
| 8,742,934 B1 | 6/2014 | Sarpy et al. | |
| 8,781,169 B2 | 7/2014 | Jackson et al. | |
| 8,799,799 B1 | 8/2014 | Cervelli et al. | |
| 8,830,322 B2 | 9/2014 | Nerayoff et al. | |
| 8,938,686 B1 | 1/2015 | Erenrich et al. | |
| 8,949,164 B1 | 2/2015 | Mohler | |
| 8,983,494 B1 | 3/2015 | Onnen et al. | |
| 9,009,177 B2 | 4/2015 | Zheng et al. | |
| 9,021,384 B1 | 4/2015 | Beard et al. | |
| 9,104,293 B1 | 8/2015 | Kornfeld et al. | |
| 9,104,695 B1 | 8/2015 | Cervelli et al. | |
| 9,111,380 B2 | 8/2015 | Piemonte et al. | |
| 9,129,219 B1 | 9/2015 | Robertson et al. | |
| 9,146,125 B2 | 9/2015 | Vulcano et al. | |
| 9,280,618 B1 | 3/2016 | Bruce et al. | |
| 10,430,444 B1 | 10/2019 | Hampton et al. | |
| 10,896,234 B2 | 1/2021 | Takahashi et al. | |
| 11,403,358 B2 | 8/2022 | Takahashi et al. | |
| 2002/0003539 A1 | 1/2002 | Abe | |
| 2002/0033848 A1 | 3/2002 | Sciammarella et al. | |
| 2002/0065691 A1 | 5/2002 | Twig et al. | |
| 2002/0116120 A1 | 8/2002 | Ruiz et al. | |
| 2002/0130867 A1 | 9/2002 | Yang et al. | |
| 2002/0130906 A1 | 9/2002 | Miyaki | |
| 2003/0052896 A1 | 3/2003 | Higgins et al. | |
| 2003/0103049 A1 | 6/2003 | Kindratenko et al. | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2004/0030492 A1 | 2/2004 | Fox et al. | |
| 2004/0039498 A1 | 2/2004 | Ollis et al. | |
| 2004/0098236 A1 | 5/2004 | Mayer et al. | |
| 2005/0031197 A1 | 2/2005 | Knopp | |
| 2005/0034062 A1 | 2/2005 | Bufkin et al. | |
| 2005/0080769 A1 | 4/2005 | Gemmell | |
| 2005/0143602 A1 | 6/2005 | Yada et al. | |
| 2005/0162523 A1 | 7/2005 | Darrell et al. | |
| 2005/0182502 A1 | 8/2005 | Iyengar | |
| 2005/0182793 A1 | 8/2005 | Keenan et al. | |
| 2005/0223044 A1 | 10/2005 | Ashworth et al. | |
| 2005/0267652 A1 | 12/2005 | Allstadt et al. | |
| 2006/0014129 A1* | 1/2006 | Coleman .................. | G09B 7/02 434/322 |
| 2006/0026170 A1 | 2/2006 | Kreitler et al. | |

(56) References Cited

U.S. PATENT DOCUMENTS

| | | |
|---|---|---|
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0077221 A1* | 3/2009 | Eisenstadt ............ G06F 16/958 709/224 |
| 2009/0088964 A1 | 4/2009 | Schaaf et al. |
| 2009/0100018 A1 | 4/2009 | Roberts |
| 2009/0112812 A1 | 4/2009 | Ellis et al. |
| 2009/0115786 A1 | 5/2009 | Shmiasaki et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2009/0303251 A1 | 12/2009 | Balogh et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0122153 A1 | 5/2011 | Okamura et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0184932 A1 | 7/2011 | Hennum et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0169769 A1 | 7/2012 | Minamino et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0313965 A1 | 12/2012 | Mochizuki et al. |
| 2012/0323888 A1 | 12/2012 | Osann, Jr. |
| 2013/0006725 A1 | 1/2013 | Simanek et al. |
| 2013/0016106 A1 | 1/2013 | Yip et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0249812 A1 | 9/2013 | Ramos et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0108419 A1 | 4/2014 | Udeshi et al. |
| 2014/0176606 A1 | 6/2014 | Narayan et al. |
| 2014/0218394 A1 | 8/2014 | Hochmuth et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0058345 A1 | 2/2015 | Mishra et al. |
| 2015/0100907 A1 | 4/2015 | Erenrich et al. |
| 2015/0106170 A1 | 4/2015 | Bonica |
| 2015/0112741 A1 | 4/2015 | Mason et al. |
| 2015/0169139 A1 | 6/2015 | Leva et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0180556 A1 | 6/2016 | Deng |
| 2016/0321351 A1 | 11/2016 | Mor et al. |
| 2016/0359705 A1 | 12/2016 | Parandehgheibi et al. |
| 2017/0032038 A1* | 2/2017 | Relkin ................ G06F 16/29 |
| 2017/0052654 A1 | 2/2017 | Cervelli et al. |
| 2018/0075061 A1 | 3/2018 | Purumala et al. |

FOREIGN PATENT DOCUMENTS

| | | |
|---|---|---|
| DE | 102013222023 | 1/2015 |
| EP | 0 763 201 | 3/1997 |
| EP | 2 575 107 | 4/2013 |
| EP | 2 858 014 | 4/2015 |
| EP | 2 963 595 | 1/2016 |
| EP | 3 133 510 | 2/2017 |
| EP | 3 547 153 | 10/2019 |
| EP | 4 242 870 | 9/2023 |
| GB | 2516155 | 1/2015 |
| NL | 2012778 | 11/2014 |
| NZ | 624557 | 12/2014 |

(56) References Cited

FOREIGN PATENT DOCUMENTS

| WO | WO 95/032424 | 11/1995 |
|---|---|---|
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

Official Communication for European Patent Application No. 19166099.2 dated Mar. 21, 2023, 9 pages.
Official Communication for European Patent Application No. 23189101.1 dated Nov. 7, 2023.
"A First Look: Predicting Market Demand for Food Retail using a Huff Analysis, " TRF Policy Solutions, Jul. 2012, pp. 30.
"Andy Turner's GISRUK 2012 Notes" <https://docs.google.com/document/d/1cTmxg7mVx5gd89lqbICYvCEnHA4QAivH4l4WpyPsqE4/edit?pli=1> printed Sep. 16, 2013 in 15 pages.
Barnes et al., "Viewshed Analysis", GIS-ARC/INFO 2001, <www.evsc.virginia.edu/~jhp7e/evsc466/student_pres/Rounds.pdf>.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Chen et al., "Bringing Order to the Web: Automatically Categorizing Search Results," CHI 2000,Proceedings of the SIGCHI conference on Human Factors in Computing Systems, Apr. 1-6, 2000, The Hague, The Netherlands, pp. 145-152.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-IJ-CX-K005, May 6, 2002, 37 pages.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ipbucker, C., "Inverse Transformation for Several Pseudo-cylindrical Map Projections Using Jacobian Matrix," ICCSA 2009, Part 1 LNCS 5592, pp. 553-564.

Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/~npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
POI Editor, "How To: Create Your Own Points of Interest," <http://www.poieditor.com/articles/how_to_create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Reddy et al., "Under the hood of GeoVRML 1.0," SRI International, Proceedings of the fifth symposium on|Vurtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Tangelder et al., "Freeform Shape Matching Using Minkowski Operations," The Netherlands, Jun. 1996, pp. 12.
Thompson, Mick, "Getting Started with GEO," Getting Started with GEO, Jul. 26, 2011.
Valentini et al., "Ensembles of Learning Machines", M. Marinaro and R. Tagliaferri (Eds.): Wirn Vietri 2002, LNCS 2486, pp. 3-20.
VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Wikipedia, "Douglas_Peucker-Algorithms," <http://de.wikipedia.org/w/index.php?title=Douglas-Peucker-Algorithmus&oldid=91846042> printed Jul. 2011, pp. 2.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.

(56) References Cited

OTHER PUBLICATIONS

Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.
Official Communication for European Patent Application No. 19166099.2 dated May 29, 2019.
Official Communication for European Patent Application No. 19166099.2 dated Mar. 15, 2021.

* cited by examiner

INTERACTIVE GEOGRAPHICAL MAP

CROSS-REFERENCE TO RELATED APPLICATION

This application is a continuation of U.S. patent application Ser. No. 17/120,567, filed Dec. 14, 2020, entitled "INTERACTIVE GEOGRAPHICAL MAP," which is a continuation of U.S. patent application Ser. No. 15/958,599, now U.S. Pat. No. 10,896,234, filed Apr. 20, 2018, entitled "INTERACTIVE GEOGRAPHICAL MAP," which claims the benefit of U.S. Provisional Patent Application No. 62/650,141, filed Mar. 29, 2018, entitled "INTERACTIVE GEOGRAPHICAL MAP", the contents of which are hereby incorporated by reference in their entireties.

TECHNICAL FIELD

The present disclosure relates to systems and techniques for geographical data integration, analysis, and visualization. More specifically, the present disclosure relates to interactive maps including data objects.

BACKGROUND

Interactive geographical maps are available from a number of providers. Analyzing such maps comprising large quantities of geolocation data associated with various data objects can be cumbersome and inefficient. Even if the data objects are displayed on a map based on their respective geolocation data, it would be difficult for a front-end user to understand the quantity of data points in various regions of the map quickly and efficiently.

SUMMARY

The systems, methods, and devices described herein each have several aspects, no single one of which is solely responsible for its desirable attributes. Without limiting the scope of this disclosure, several non-limiting features will now be discussed briefly.

A system that provides conventional clustering of data on a map user interface may appear as a grid representation of data with one or more circles of different sizes, and may appear to be a spatially incorrect representation of the data. The system may also lack the ability to adjust the clustering in real-time with viewport adjustments provided by the front-end user.

Also, transmitting large volumes of data to a front-end system to process and render on a map can lead to additional inefficiencies. For example, if a large volume of geospatial data with a high accuracy is received by a front-end system, the processing and rendering requirements may be too high for a typical front-end system to execute in a timely fashion, or at all.

Further, transmitting large volumes of data points to a front-end system can lead to additional problems. For example, a slow or unreliable network or internet connection may result in a front-end system not receiving the necessary data until a significant amount of time passes preventing efficient rendering of the map and data.

The systems, methods, and devices of the present disclosure may provide, among other features, high-performance, interactive geographical and/or data object map capabilities in which large amounts of geographical, geospatial, and other types of data, geodata, objects, features, and/or metadata are efficiently presented to a user on a map interface. In various embodiments, an interactive geographical map display system may enable rapid and deep analysis of various objects, features, and/or metadata by the user. In some embodiments, the systems, methods, and devices of the present disclosure may provide visual results that appear to be more spatially correct than conventional aggregation and clustering methods thereby improving the user experience and efficiency. Moreover, less data is needed to be transmitted to a front-end system, or user device, yielding time-saving results in transmitting, processing, and rendering the data efficiently.

In some embodiments, a back-end system can aggregate geolocation values associated with a plurality of data objects to reduce the amount of data to process and render. For example, a set of data objects can be associated with geolocation data representing a location on a map of each particular data object, and those data objects can be aggregated to one area on a map within a certain threshold area (e.g. based on less precise geolocation data). In some embodiments, geolocation data can comprise geohash data, GPS coordinate, or the like. While the discussion below may discuss the embodiments in terms of geohash data, any geolocation data can be used to achieve the embodiments described. In some embodiments, for example in embodiments using geohash data, the back-end system can determine a grid on a map, and determine data objects associated with each cell of the grid on the map.

Also, in some embodiments, another benefit provided by the systems and methods described herein is reducing the complexity of the back-end systems, thereby improving performance of the back-end system. For example, the back-end system can also calculate the clustering and push the clustered data to the front-end system. In this example, a similar visual effect would appear on the front-end system as if the front-end system was calculating the clustering, except the back-end speed and complexity would be increased and limited by a connection (e.g., connection speed, latency, etc.). Thus, in some embodiments, in order to handle the selection and filtering, the back-end system would also have to be either stateful (i.e., the computer or program keeps track of the state of interaction, usually by setting values in a storage field designated for that purpose), or implement a complex clustering filtering algorithm in order to produce consistent results. For example, if a user were to select a cluster and then zoom into the viewport via a front-end system, the back-end system would have to be the service to resolve the clusters and selections, and then determine which regions or partial regions are selected. Using a grid-based aggregation approach, the system and methods are able to offload the clustering algorithms to the front-end system, so that it is trivial to swap the clustering aspects out, and therefore free up complexity from the back-end system. This will not only speed up the queries dramatically, but also keep the API simple and stable. In general, comparing to a back-end system that performs the clustering, the present disclosure comprises a flexible and responsive front-end system, and provides significantly less load and/or complexity on the back-end system.

After a set of data objects are aggregated (for example, on a grid using geohash values) into aggregate values, the back-end system can transmit the aggregate values (i.e. the particular grid elements that comprise data objects and the total number of data objects the grid element represents) to a front-end system. The front-end system, or user device, may then apply a clustering algorithm on the aggregate values and display the clusters (e.g. as circles) and/or grid elements (e.g. as squares or rectangles) on a map. It is advantageous to aggregate the geohash values prior to clustering because it results in greater efficiency in determining the circles (i.e. less computationally demanding), where the size of each circle can represent the quantity of aggregate values represented by the circle despite clustering fewer items (i.e. all data objects versus a set of aggregate values representing the data objects).

In some embodiments, the front-end system can automatically cluster the aggregate values already stored the front-end system upon adjusting the viewport (e.g. panning or zooming) prior to receiving updated clustering instructions from a back-end system. Then, upon receipt of updated aggregate values from the back-end system, the front-end system can render updated clustering granularity. For example, the front-end system can render an estimated clustering based on the previously determined aggregate values. Then, as soon as the updated aggregate values are received by the front-end system, the front-end system can update the clustering based on the updated aggregate values received from the back-end system.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of geographical information and may enable a user to more quickly access, navigate, assess, and digest such information than previous systems.

In some embodiments, data may be presented in graphical representations, such as visual representations, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In some embodiments, a computer-implemented method of generating an interactive geographical map may comprise: receiving, via a network communication interface, a set of data objects comprising geolocation information; receiving, via a network communication interface, search criteria comprising at least information associated with a current viewport; determine a subset of data objects based at least in part on the current viewport, wherein the subset of data objects is a subset of the set of data objects; calculating a plurality of aggregate values by aggregating the subset of data objects within an aggregation threshold based at least in part on the geolocation information of each data object of the subset of data objects, wherein each aggregate value represents one or more data objects; clustering the plurality of aggregate values into one or more clusters; and generating a map displaying the one or more clusters based at least partly on the current viewport, wherein each cluster is displayed as a cluster circle comprising a color and a size, wherein the size of each of the cluster circles is based at least in part on the number of data objects the cluster represents.

Additionally, in some embodiments, the computer-implemented method may also comprise additional limitations, such as each aggregate value comprises a number reflecting the total number of data objects the aggregate value represents; the information associated with a current viewport is based at least partly on two geolocations; the two geolocations are the geolocations appearing on opposite corners of the current viewport; the aggregate values are calculated by an aggregation algorithm such that the total number of aggregate values calculated remain less than the aggregation threshold; the aggregation threshold is a preconfigured limit based at least partly on the number of aggregate values; the aggregating is based at least partly on adjusting the degree of accuracy of the geolocation data; and/or the clustering is based at least partly on the locations of the aggregate values.

Additionally, in some embodiments, the computer-implemented method may also comprise one or more of: receiving, via a network communication interface, additional search criteria; determining, an updated subset of data objects, wherein the updated subset of data objects is a subset of the set of data objects; calculating an updated plurality of aggregate values by aggregating the updated subset of data objects within the aggregation threshold; clustering the updated plurality of aggregate values into one or more clusters; generating a map displaying the one or more clusters; receiving, via a network communication interface, a selection of at least one cluster circle; upon receiving the selection, generating a map displaying one or more clusters, wherein the selected cluster circle is updated with an indicator indicating the selection; and/or wherein the map further displays the plurality of aggregate values associated with the selected cluster circle.

Additionally, in some embodiments, the computer-implemented method may also comprise one or more of: receiving, via a network communication interface, an adjustment to the current viewport; upon receiving the adjustment, determining an adjusted subset of data objects based at least in part on the current viewport, wherein the adjusted subset of data objects is a subset of the set of data objects; calculating a plurality of adjusted aggregate values by aggregating the adjusted subset of data objects within the aggregation threshold; clustering the plurality of adjusted aggregate values into one or more adjusted clusters; and generating the map displaying the one or more adjusted clusters; and/or the adjustment is based at least partly on zooming into the current viewport, wherein the selected cluster circle is updated to comprise a plurality of cluster circles each with an indicator indicating that the circles are selected, and/or wherein the adjustment is based at least partly on zooming out of the current viewport, wherein the selected cluster circle is updated to comprise additional aggregate values and a new indicator indication a partial selection of the cluster circle.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1A:
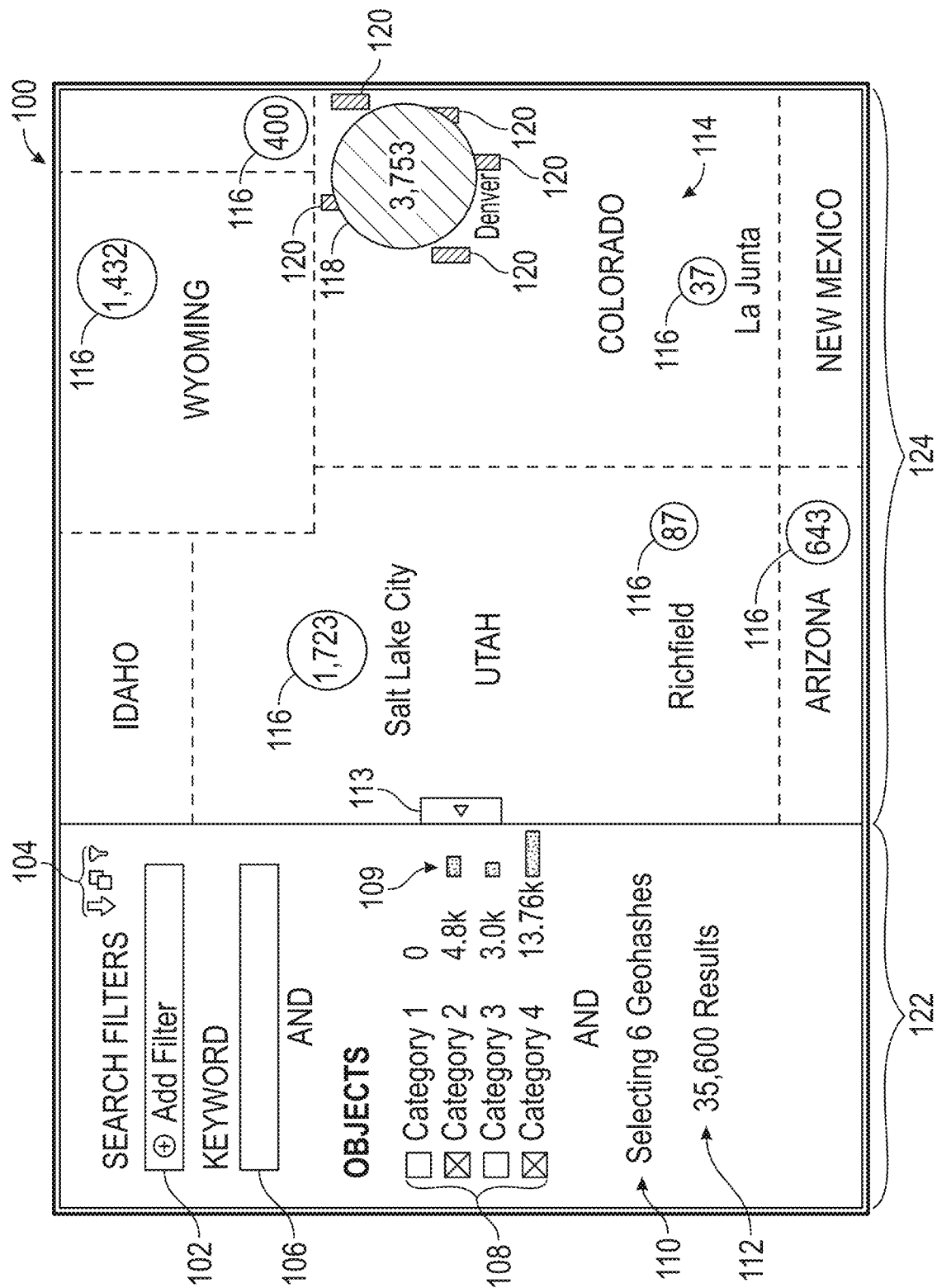
FIGS. 1A-1E illustrate example interactive graphical user interfaces of an interactive geographical map display system, including an interactive geographical map, according to embodiments of the disclosure.

The systems, methods, and devices of the present disclosure may provide, among other features, high-performance, interactive geospatial and/or data object map capabilities in which large amounts of geographical, geospatial, and other types of data, geodata, objects, features, and/or metadata are efficiently presented to a user on a map interface. In some embodiments, the systems, methods, and devices of the present disclosure may provide visual results that appear to be more spatially correct than conventional aggregation and clustering methods thereby improving the user experience and efficiency. Moreover, less data is needed to be transmitted to a front-end system, or user device, yielding time-saving results in transmitting, processing, and rendering the data efficiently.

In some embodiments, a back-end system can aggregate geolocation values associated with a plurality of data objects to reduce the amount of data to process and render. For example, a set of data objects can be associated with geolocation data representing a location on a map of each particular data object, and those data objects can be aggregated to one area on a map within a certain threshold area (e.g. based on less precise geolocation data). In some embodiments, geolocation data can comprise geohash data, GPS coordinate, or the like. While, the discussion below may discuss the embodiments in terms of geohash data, any geolocation data can be used to achieve the embodiments described. In some embodiments, for example in embodiments using geohash data, the back-end system can determine a grid on a map, and determine data objects associated with each cell of the grid on the map.

After a set of data objects are aggregated (for example, on a grid using geohash values) into aggregate values, the back-end system can transmit the aggregate values (i.e. the particular grid elements that comprise data objects and the total number of data objects the grid element represents) to a front-end system. The front-end system may then apply a clustering algorithm on the aggregate values and display the clusters (e.g. as circles) and/or grid elements (e.g. as squares or rectangles) on a map. It is advantageous to aggregate the geohash values prior to clustering because it results in greater efficiency in determining the circles (i.e. less computationally demanding), where the size of each circle can represent the quantity of aggregate values represented by the circle despite clustering fewer items (i.e. all data objects versus a set of aggregate values representing the data objects).

In some embodiments, the back-end system does a count of the data objects and/or grid elements using the geolocation values of the data objects that would otherwise appear in a front-end system's viewport prior to aggregation. Then the back-end system performs the aggregation based on the tallied number of aggregate values in the viewport and a particular maximum specified, or aggregation threshold. After aggregation, the back-end system transmits the aggregate values to a front-end system which can then perform clustering. The clustering results in various circles being drawn on the map in the viewport. In some embodiments the size of each of the circles is based at least partly on the total number of data points the circle encompasses. In some embodiments, the circle does not visually cover or overlap all the data points it represents. In some embodiments, the location of the circles can be drawn in the middle of the aggregated data points (i.e. at a weighted center based on all aggregated data points represented by the circle).

Moreover, having fewer aggregate values can simplify transmission of the data from the back-end system to the front-end system and demand fewer resources from the front-end system. Aggregate values should be understood to represent a set of data objects that are visually rendered on a map based on each of the data object's respective geolocation data. Thus, aggregate values are a visual representation of one or more of the data objects that have been grouped together via an aggregation algorithm. It should also be appreciated that although data objects may comprise a unique identifier and associated geolocation data, the data objects can also comprise additional information. For example, if a data object represents a particular person, the data object associated with that person may also comprise information related to the person's profession, age, residency information, training or qualification, group memberships, or any other information for that particular person. It should be appreciated that limited information is processed and/or transmitted between the systems. For example, the location of each cell of a grid overlaid on a map where data objects have been aggregated, and the number of data objects associated with each grid cell where data objects have been aggregated.

In some embodiments, a back-end system comprising a plurality of data objects can receive criteria related to a particular search from a front-end system. Such criteria can include selection of a set of data objects, a search resulting in a subset of the selected data objects, the current front-end system's viewport, or other filtering and display instructions. For example, upon each changing of the current viewport (e.g. by zooming in or out, or panning), the front-end system can transmit the new viewports to the back-end system, such as geolocation values of two or more locations (e.g. corners) of the current viewport, so that the back-end system can determine what data and rendering instructions to transmit to the front-end system.

In some embodiments, due to potential bandwidth limitations between a front-end and a back-end system, and/or processing limitations of the front-end system, the back-end system can filter the data it transmits in addition to aggregation. For example, in addition to aggregating the data, the back-end system can also prevent transmission of data with geolocations outside of the viewport for additional efficiency. In some embodiments, the selected granularity by the back-end system of the geolocation data associated with the data objects can be based partly on the capabilities of the front-end system. Thus, in some embodiments, the back-end system can prepare and transmit aggregate values that are both within the viewport and aggregated to a particular level of granularity, within a specified aggregation threshold. By doing this, data outside of the viewport and the additional detailed geolocation data for each particular data object will not be transmitted to a front-end system nor processed by the front-end system, saving bandwidth and processing power. Such savings can result in energy savings and more efficient workflow by reducing loading times between various interactions with the map.

In some embodiments, as the viewport is zoomed in, the back-end system can provide a geolocation value (e.g. geohash data) of higher accuracy or granularity and aggregate fewer data objects within a certain aggregation threshold. Additionally, as the viewport is zoomed out, the back-end system can provide a geolocation value of lower accuracy and aggregate more of the data objects within the aggregation threshold. For example, for a given zoom level (i.e. viewport), the back-end system creates a grid of aggregated data points to provide a number of squares or rectangles less than a preconfigured maximum value, or aggregation threshold. Thus, in some embodiments, the back-end system's aggregation of data can be performed when the number of data objects to be plotted would exceed the maximum number of data objects specified by the aggregation threshold. Consequently, in some instances, the number of displayed data objects, or aggregate values, may remain the same upon varying viewport adjustments, for example, by having few or no data objects being introduced in an updated viewport (i.e. by zooming out), the display may remain the same or similar to what was displayed prior to updating the viewport.

In some embodiments, the front-end system can automatically cluster the aggregate values already stored the front-end system upon adjusting the viewport (e.g. panning or zooming) prior to receiving updated clustering instructions from a back-end system. Then, upon receipt of updated aggregate values from the back-end system, the front-end system can render updated clustering granularity. For example, the front-end system can render an estimated clustering based on the previously determined aggregate values. Then, as soon as the updated aggregate values are received by the front-end system, the front-end system can update the clustering based on the updated aggregate values received from the back-end system. It should be appreciated that rendering an estimated clustering immediately, in real time, is advantageous because it allows a user to seamlessly interact with the data and map without having to wait for updated instructions or aggregate values from a back-end server. Additionally, it should be appreciated that in some instances, the updated clustering based on the updated aggregate values may be similar to, or the same as, the estimated clustering based on the previously determined aggregate values determined by the front-end. This may be especially true for minor changes to the viewport because with minor changes it is likely that the updated aggregate values would be very similar to the previously determined aggregate values.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1A illustrates an example interactive geographical map user interface 100 of an interactive geographical map display system depicting an interactive geographical map with viewable and selectable data, filter settings, and search settings. This description, and the descriptions following the other Figures herein, are provided for the purpose of providing examples and are not intended to limit the techniques to the example embodiments described. The discussion below and herein describes features associated with an interactive geographical map display system and features associated with one or more user device(s), as well as a front-end system, back-end system, and database systems. It should be appreciated that in some embodiments, the interactive geographical map display system can encompass some or all of the features of the front-end system, back-end system, user device(s), and database systems.

In some embodiments, the interactive geographical map user interface 100 can display, by a user device based on information received from an interactive geographical map display system, information associated with a plurality of data objects. In some embodiments, the interactive geographical map user interface 100 can display various clustered groupings or clusters 116 of data objects. The clusters can be based on aggregate values received from a back-end system. In some embodiments, upon selection of a cluster 116, the front-end system can display a selected cluster 118 that may comprise an indication of selection. Additionally, in some embodiments, upon selection, the system can also display the aggregate values or grid elements 120 associated with the selected cluster 118. Geohash values can be used to determine the aggregate values or grid elements 120. For example, in some embodiments, a number of data objects associated with geolocation data can be plotted on a grid overlaying a map using geohash values. The data object's geohash values can be limited by fewer characters so that the data objects are effectively grouped by proximity based on less precise geolocation, or geohash, data into a grid element 120. For example, as a user zooms out of a map, the system can reduce the precision of each respective plotted object's geolocation data by rounding, simplifying, or truncating the geohash values of the data objects to an appropriate amount of characters. For example, two data objects that are plotted near enough to each other may overlap in the same grid element (see below) and be aggregated by the back-end system based on truncated geohash values. Thus, in some embodiments, the geohash values can be truncated at the appropriate character. In FIG. 1A, for example, the system can depict the number of grid elements selected 110, which represent a group of geohash data, by selecting the selected cluster 118. It should be appreciated that in some circumstances not all grid elements 120 would be visible, for example, some grid elements 120 would be underneath the selected cluster 118 and would not be visible from certain views. It should also be appreciated that more than one cluster can be selected by a user, as described in more detail below. It should be appreciated that one or more clusters can overlap each other and the system may or may not display the overlapped portions of the clusters. Also, in it should be understood in some embodiments, that although certain grid elements 120 may be displayed (e.g., when an associated cluster is selected), and other grid elements may not be displayed.

In some embodiments, the process of aggregation results in a number of values or objects that are grouped together to form a single value, or an object of more significant meaning. In some embodiments, aggregate values can represent one or more data objects that have been grouped together via an aggregation algorithm and to be displayed on a grid or map in a grid element. The aggregate value also comprises information related to how many data objects the aggregate value represents.

Also, in some embodiments, clustering comprises the grouping of a set of data objects, or grid elements, based on proximity to each other. For example, grouping data objects in the same group (called a cluster) are closer to each other than to those in other groups (clusters). The intricacies of the varying clusters can depend on the clustering algorithm used. In some embodiments, clusters can also be represented as circles, or cluster circles, on a map. In other implementations clusters can be represented by different shapes or visual elements on the map.

Additionally, in some embodiments, as described herein, an aggregate threshold, or aggregate threshold value, is a preconfigured maximum number of data objects and/or grid elements (see below) to be transmitted to a front-end system for display. For example, in some embodiments, the back-end system aggregates the total number of data objects into grid elements based on the aggregate threshold, such that the total number of grid elements transmitted to the front-end system does not exceed the aggregate threshold value.

In some embodiments, grid element(s) comprise square or rectangular sections of a grid overlaid on a map covering at least the viewable area of the map. For example, in some embodiments, one or more data objects can be aggregated into one of the square or rectangular sections of the grid as an aggregate value. In some embodiments, the grid elements (e.g. as squares or rectangles) can be highlighted or displayed on a map, for example, if a cluster circle is selected.

In some embodiments, a map area 124 can be rendered for display in at least a portion of a screen, or viewport 124. In some embodiments, the viewport 124 can comprise the entire screen. For example, a user can select, via a user interface, toggle 113 to hide the search panel 122 from view and expand the viewport 124 to comprise substantially the entire screen.

In some embodiments, the interactive geographical map user interface 100 can display any type of map overlay 114, such as a region of the United States, or any other part of the world. In some embodiments, the map overlay 114 can comprise the interior of one or more buildings (e.g. a birds-eye view of a floorplan, or an elevation view of some or all floors), an area of a city (e.g. a park), or any other physical area. Moreover, the map overlay can comprise various textures (e.g. satellite views, terrain views, elevation views, road mappings, or the like). The map overlay can also include varying levels of detail, including descriptive text (e.g. city names, river names, or the like) or borders between entities (e.g. states, countries, counties, neighbors, or the like).

In some embodiments, a search panel 122 can also be displayed for interaction by a user. For example, a user can add a search filter 102 or keywords 106 to further refine the data objects plotted onto the viewport 124. In some embodiments, a user can download, copy, or further refine the search filter 102 with additional settings 104. Additionally, in some embodiments, a user can select which categories of data objects to plot in the viewport 124. For example, a user can select Category 2 and Category 4, as shown in FIG. 1A, to plot the data objects associated with those two categories. In some embodiments, the total number of data objects associated with each category can be displayed. In some embodiments, the total number of data objects associated with each category displayed in the viewport 124 can be displayed. In some embodiments, an indicator of the proportion of the relative category data objects to the total of the data objects imported or displayed in the viewport 124. In some embodiments, the total number of data objects 112 displayed in the viewport 124, or otherwise available for display, can be displayed as well.

Figure 1B:
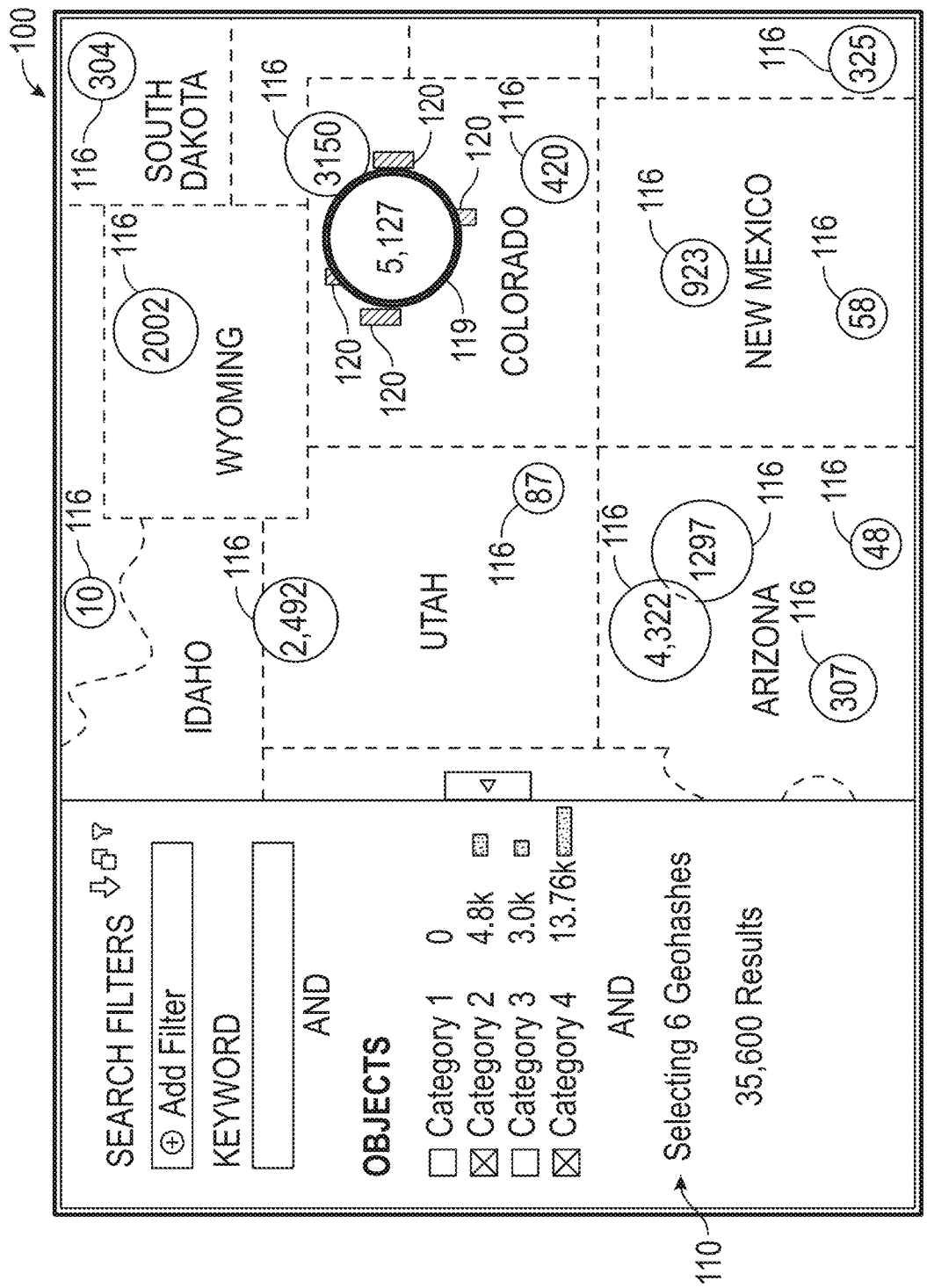

FIG. 1B illustrates an embodiment of an interactive geographical map user interface 100 of an interactive geographical map display system depicting an interactive geographical map with viewable and selectable data, filter settings, and search settings. The interactive geographical map user interface 100 in FIG. 1B is a zoomed out viewport 124 of FIG. 1A, where a user changed the viewport 124 to display a wider range of geolocational data. Upon zooming out, the back-end system recalculated the aggregate values and transmitted the data to the front-end system for clustering and display. FIG. 1B displays the data after all processing has been completed. Similar to FIG. 1A, new clusters 116 have been rendered and displayed. In some embodiments, the aggregate values or grid elements 120 associated with the selected cluster or data objects can be displayed, similar to FIG. 1A. However, it should be appreciated, that the partially selected cluster 119 is associated with more aggregate values or grid elements 120 and data objects than what would be displayed because only the selected portions would be displayed. It should also be appreciated that the number of grid elements, or geohashes, selected 110 should not change upon zooming.

In some embodiments, if a user has selected a cluster, such as selected cluster 118 in FIG. 1A, and then zooms out of the viewport 124, the updated clustering can result in the selected cluster 118 being merged with additional aggregate values to form a larger partially selected cluster 119. The partially selected cluster 119 has a new indicator to indicate that portions of the cluster have been selected by the user, but not all data represented by the cluster. In some embodiments, a user can zoom back in to the relative position in FIG. 1A and view the same screen that was previously viewed in FIG. 1A, after the back-end and front-end systems recalculate the aggregate values and clusters, respectively. In some embodiments, it may be preferable to store previously run calculations for more efficient viewing and interactivity.

Figure 1C:
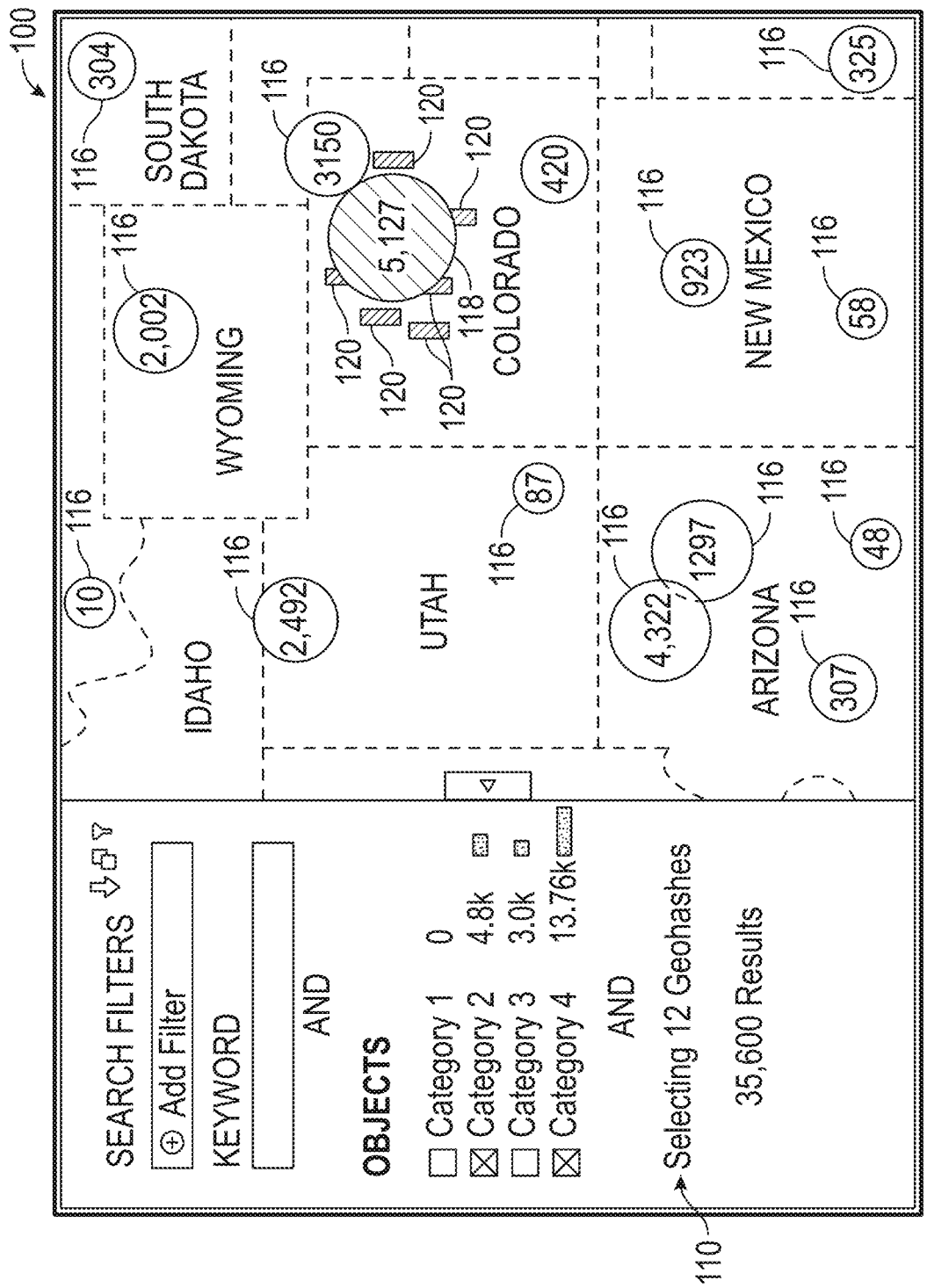

FIG. 1C illustrates an embodiment of an interactive geographical map user interface 100 of an interactive geographical map display system depicting an interactive geographical map with viewable and selectable data, filter settings, and search settings. The interactive geographical map user interface 100 in FIG. 1C is the same viewport 124 and zoom level as the interactive geographical map user interface 100 in FIG. 1B, however, a user has selected the partially selected cluster 119 so that it becomes a selected cluster 118. Upon selection of the partially selected cluster 119, the selected cluster 118 indicator is rendered along with the newly selected aggregate values 120 that were not present before. It should also be appreciated that the number of grid elements, or geohashes, selected 110 should change upon the new selection.

Figure 1D:
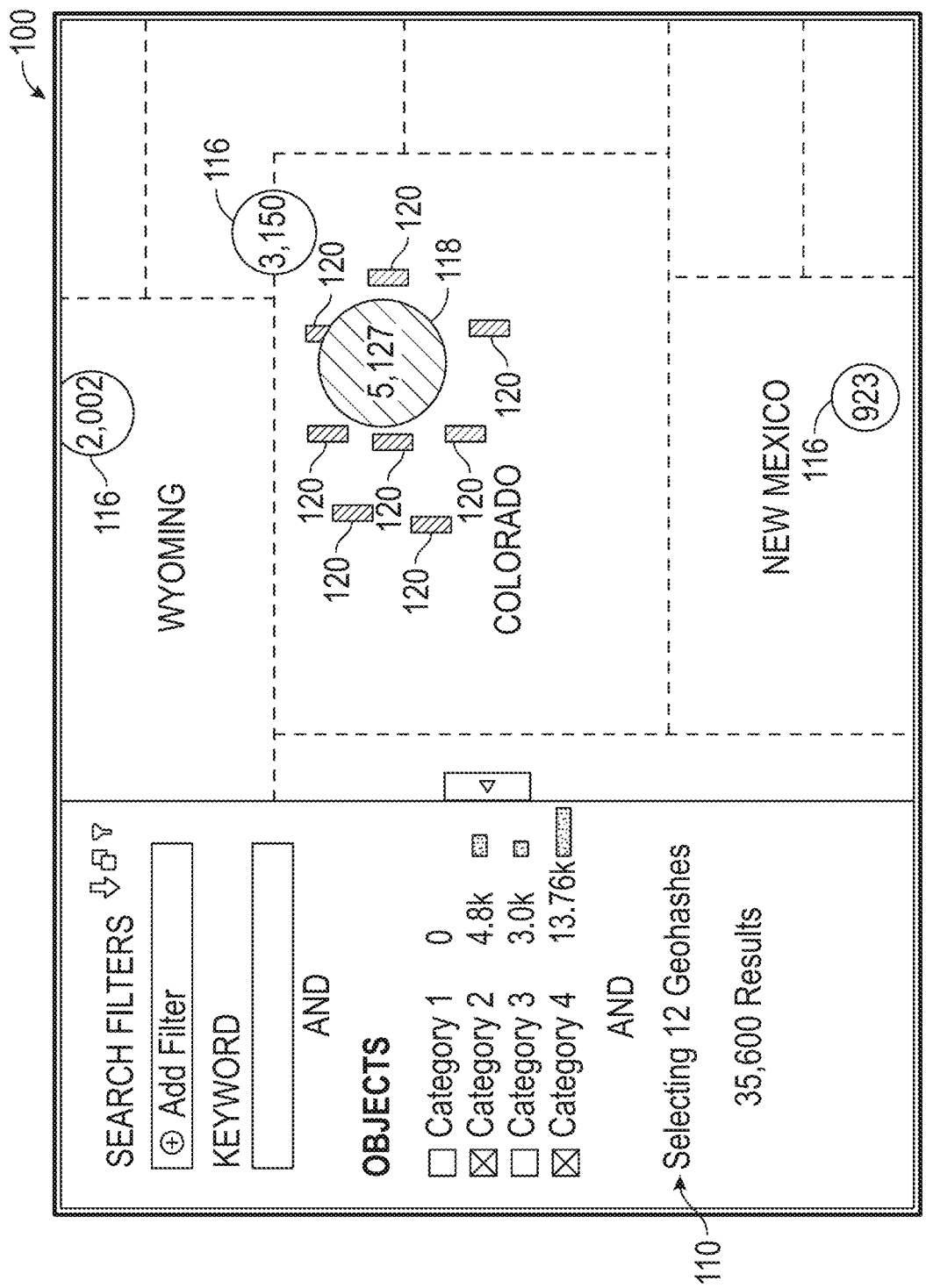
Figure 1E:
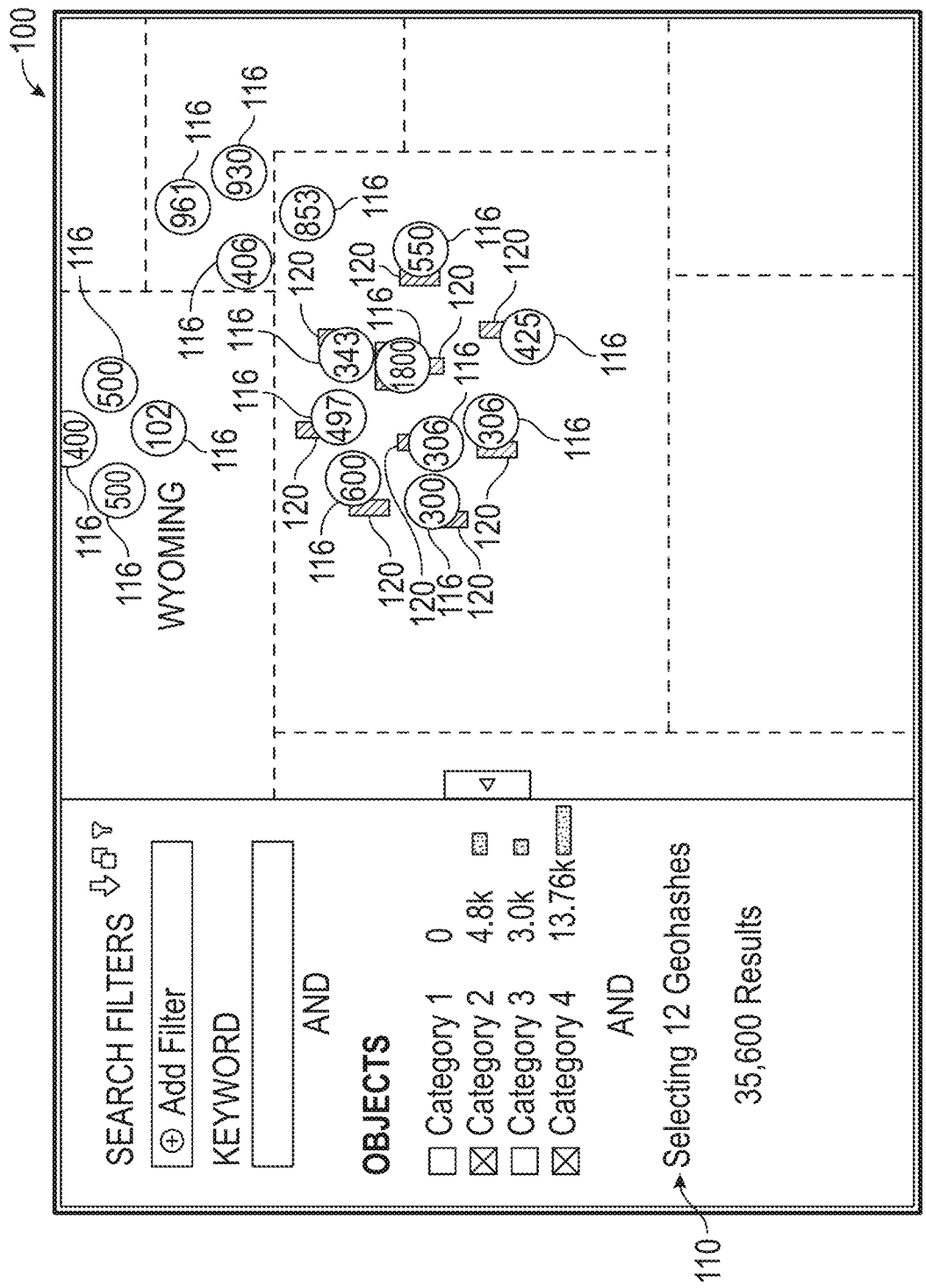

FIGS. 1D and 1E illustrate an embodiment of an interactive geographical map user interface 100 of an interactive geographical map display system depicting an interactive geographical map with viewable and selectable data, filter settings, and search settings. The interactive geographical map user interface 100 in FIGS. 1D and 1E are zoomed in viewport 124 views of FIG. 1C. However, the aggregate data and clusters depicted in FIG. 1D is an estimate of the data received from the back-end system with respect to FIG. 1C. In some embodiments, the front-end system can automatically cluster the aggregate values already stored the front-end system upon adjusting the viewport (e.g. panning or zooming) prior to receiving updated clustering instructions from a back-end system. Then, upon receipt of updated aggregate values from the back-end system, the front-end system can render updated clustering granularity (see FIG. 1E).

For example, in some embodiments, the front-end system can render an estimated clustering based on the previously determined aggregate values (e.g., FIG. 1D). Then, as soon as the updated aggregate values are received by the front-end system, the front-end system can update the clustering based on the updated aggregate values received from the back-end system (e.g., FIG. 1E). It should be appreciated that zooming in and/or out should not affect the number of grid elements, or geohashes, selected 110. Also, it should be appreciated that the estimated clustering (FIG. 1D) and the updated clustering (FIG. 1E) should comprise the same number of data objects. It should also be appreciated that in some circumstances (e.g. when there are very few data objects and/or clusters in an area, or when there are minimal changes to the zoom level), the estimated clustering and updated clustering should be substantially similar.

Figure 3:
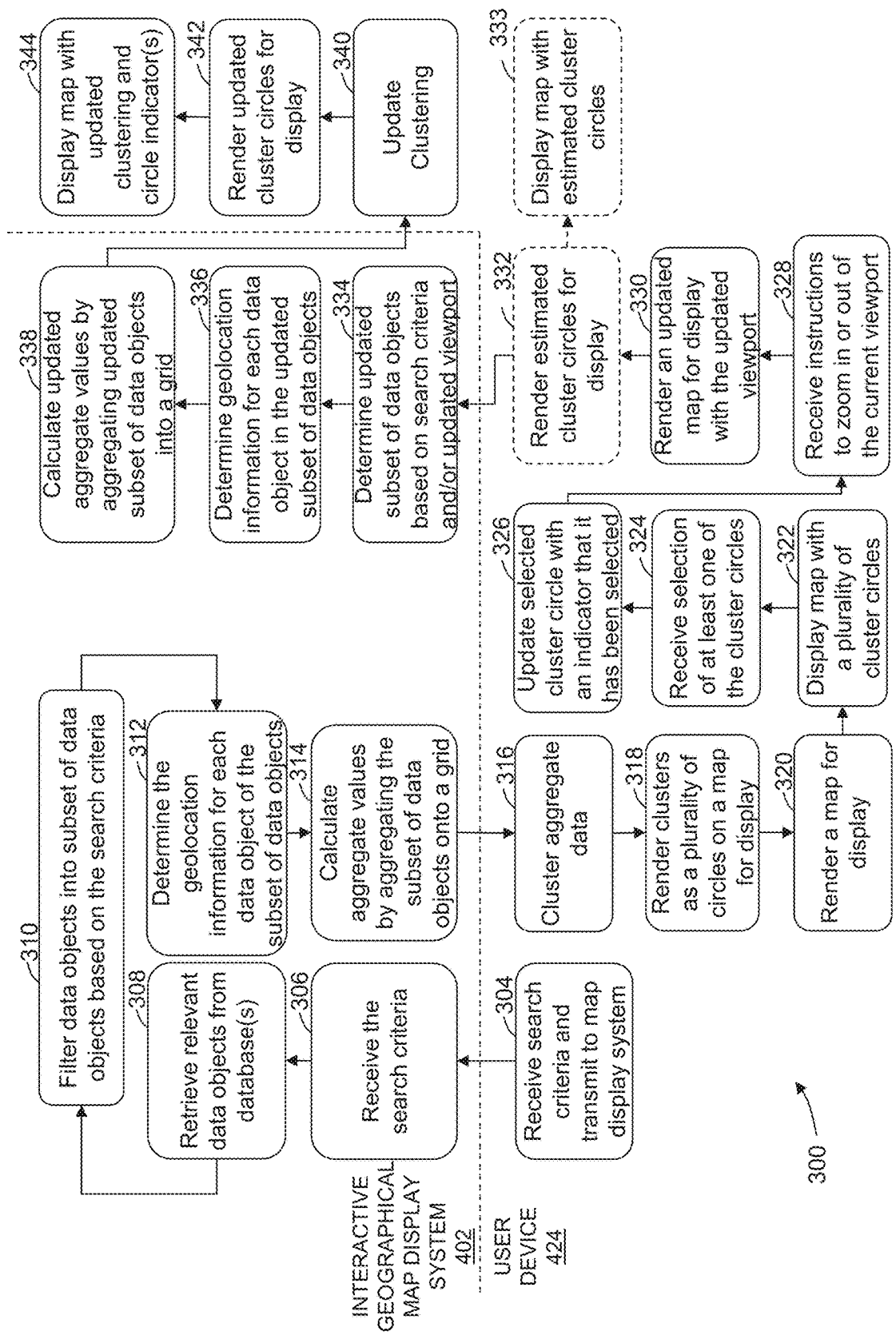
FIG. 3 illustrates a flow chart diagram illustrating functionality of the system related to dynamically updating the interactive geographical map, according to various embodiments of the present disclosure.

FIG. 3 illustrates a flow chart diagram illustrating functionality of the system related to dynamically updating the interactive geographical map, according to various embodiments of the present disclosure. However, it should be appreciated that many variations and modifications may be made to the embodiments described herein and in this figure, the elements of which are to be understood as being among other acceptable examples. All such modifications and variations are intended to be included herein within the scope of this disclosure. Also, all steps and blocks should be interpreted to be acceptable in no particular order, except where the system or method would not function for its intended purpose. One or more of the blocks described may be optional in certain implementations. Additionally, The discussion below and herein describes features associated with an interactive geographical map display system 402 and features associated with one or more user device(s) 424, as well as a front-end system, back-end system, and database systems. It should be appreciated that in some embodiments, the interactive geographical map display system 402 can encompass some or all of the features of the front-end system, back-end system, user device(s) 424, and database systems.

In block 304, a user device 424 can be configured to receive search criteria and to transmit the search criteria to an interactive geographical map display system 402. It should be appreciated that the user device 424 system and interactive geographical map display system 402 described in reference to FIG. 4 could be configured in ways other than those described in FIG. 4 for the purposes of the functionality described in FIG. 3 and herein. Also, the user device 424 can represent a front-end system and the interactive geographical map display system 402 can represent a back-end system, as further described herein.

In block 306, the interactive geographical map display system 402 receives the search criteria from the user device 424.

In block 308, the interactive geographical map display system 402 retrieves relevant data objects from one or more database(s). In some embodiments, the interactive geographical map display system 402 can be configured to receive data objects from one or more database(s). Further, in some embodiments, relevant data objects can include data objects that are related to the search criteria, a particular user or group, quality of the data, or any other information that could be used in determining relevancy. The relevant data objects would be pre-filtered prior to being retrieved or received by the interactive geographical map display system 402.

In block 310, the interactive geographical map display system 402 is configured to filter the data objects from block 308 based on the search criteria. Where block 308 may limit the data objects the system receives, block 310 filters the data objects already in the interactive geographical map display system 402. In some embodiments, search criteria can include a current viewport of the user device 424, particular search strings received by the user device 424, a selection of a set of data objects, a selection of a subset of the selected data objects, and/or any additional filtering or display instructions. In some embodiments, the filtered set of data objects can be a subset of the data objects or comprise the entire set of data objects (i.e., if no data objects have been filtered). In some embodiments, upon each changing of the current viewport, the user device 424 can transmit the new viewports to the interactive geographical map display system 402, such as geolocation values of two or more locations (e.g. corners) of the current viewport, so that the interactive geographical map display system 402 can determine what data and rendering instructions to transmit to the user device 424.

In block 312, the interactive geographical map display system 402 determines the geolocation information for each data object of the filtered set of data objects. In some embodiments, geolocation data can comprise geohash data, GPS coordinate, or the like. In some embodiments, for example in embodiments using geohash data, the back-end system can determine a grid on a map, and determine data objects associated with each cell of the grid on the map.

In block 314, the interactive geographical map display system 402 aggregates the filtered set of data objects onto a grid in the form of aggregate values. It should be appreciated that any aggregation algorithm can be used to determine the aggregate values. Aggregate values can comprise information related to which elements on a grid comprise data objects and a magnitude of total data objects each element on the grid represents. For example, a particular grid element may represent 100 data objects but it would be indistinguishable from another grid element representing 10 data objects. Thus, information regarding how many data objects each element represents is also determined in this step. In some embodiments, aggregation can include data objects outside of the viewport for the purposes of accuracy, but the interactive geographical map display system 402 can transmit only what will be used for displaying clusters in the viewport. So, clusters shown can be based on data not necessarily displayed in the viewport. For example, in some instances, aggregate values outside of the viewport that would represent data objects outside the viewport would not be displayed by the user device 424 because the user device 424 would only display clusters and aggregate values that would appear in the viewport. However, if particular aggregate values are near the border of the viewport, yet still outside of the viewport, clustering calculations performed by the user device 424 can be affected by such data and the functionality of all systems would be improved by having such data available to the user device 424 to increase accuracy and reliability of the information presented.

In block 316, user device 424 receives the aggregate values from block 314 and performs clustering on the aggregate values to determine clusters. It should be appreciated that any clustering algorithm can be used to determine the clusters.

In block 318, the user device 424 renders the determined clusters as a plurality of circles on a map for display, where each circle represents one or more aggregate values and is in a location on the map that is between all represented aggregate values. In some embodiments, the location of each circle is based on the specific clustering algorithm used, the centroid of each represented aggregate value, and/or a weighted center of the represented aggregate values based on the quantity of data objects represented by each aggregate value. For example, a cluster of two aggregate values, A and B, might be represented by a circle that is closer to the aggregate value A representing a higher number of data objects than aggregate value B. In some embodiments, the circle may be exactly at the center of the two aggregate values, A and B, as measured by the center of the grid elements associated with A and B. In some embodiments, the cluster circle size can also be based on the specific clustering algorithm used. In some embodiments, the cluster circle size can be based on the total number of data objects the circle represents, such that the more data objects represented, the larger the circle. In some embodiments, the sizes of the circles can also change proportionally with changes to the quantity of data objects represented. In some embodiments, the sizes of the circles can be exaggerated and be displayed larger or smaller than they would otherwise be if the sizes were proportionally related to the quantity of data objects.

The user device 424 then renders a map for display based on the viewport, aggregate values, and cluster circles in block 320. Then, in block 322, the user devise 424 displays the map with a plurality of cluster circles.

In block 324, the user device 424 receives a selection of at least one of the cluster circles. Then, in block 326, the user device 326 updates the selected cluster circle with an indicator that it has been selected. The indicator can be that of a different color, texture, or the like.

In block 328, the user device 424 can receive instructions to zoom in or zoom out of the current viewport. Then, in block 330, the user device renders an updated map for display with an updated viewport. In some embodiments, upon each changing of the current viewport, the user device 424 can transmit the new viewports to the interactive geographical map display system 402, such as geolocation values of two or more locations (e.g. corners) of the current viewport, so that the interactive geographical map display system 402 can determine what data and rendering instructions to transmit to the user device 424.

Optionally, in block 332, the user device 424 renders estimated cluster circles for display based on the aggregate values previously received from the interactive geographical map display system 402. For example, once aggregate values have been transmitted to the user device 424 the information is stored on the device temporarily so that the user device 424 can estimate clusters with any viewport changes in real-time, prior to receiving updated aggregate values from the interactive geographical map display system 402. Once the estimated clusters are determined, the user device can display an updated map with the estimated cluster circles overlaid on the updated viewport in real-time, in block 333.

Then, in block 334, the interactive geographical map display system 402 determines an updated subset of data objects based on the search criteria and/or updated viewport.

In block 336, the interactive geographical map display system 402 gathers or receives the geolocation information for each data object in the updated subset of data objects. This step should be substantially similar to the block 312.

In block 338, the interactive geographical map display system 402 calculates updated aggregate values by aggregating the data objects in the updated subset of data objects. The calculation should be substantially similar to the aggregation determination in block 314.

In block 340, the interactive geographical map display system 402 transmits the aggregate values to the user device 424, where the user device 424 receives the aggregate values. The user device 424 then updates the clustering based on the new aggregate data, similar to the clustering performed in block 316.

In block 342, the user device renders updated cluster circles for display. The process should be substantially similar to blocks 318 and 332.

In block 344, the user device 424 displays a map with updated cluster circles and circle indicators representing the data selected in block 324. It should be appreciated the system retains the selection of information from block 324 through any viewport adjustment or search criteria adjustment. For example, although the clustering may change upon zooming in or out of the viewport, the selection of a cluster circle (and therefore associated data objects) should persist through each adjustment. It should be appreciated that a selection of a cluster circle is also a selection of a set of one or more aggregate values associated with the selected cluster circle. Further, a selection of a set of one or more aggregate values associated with the selected cluster circle is also a selection of the data objects associated with the set of one or more aggregate values.

Figure 4:
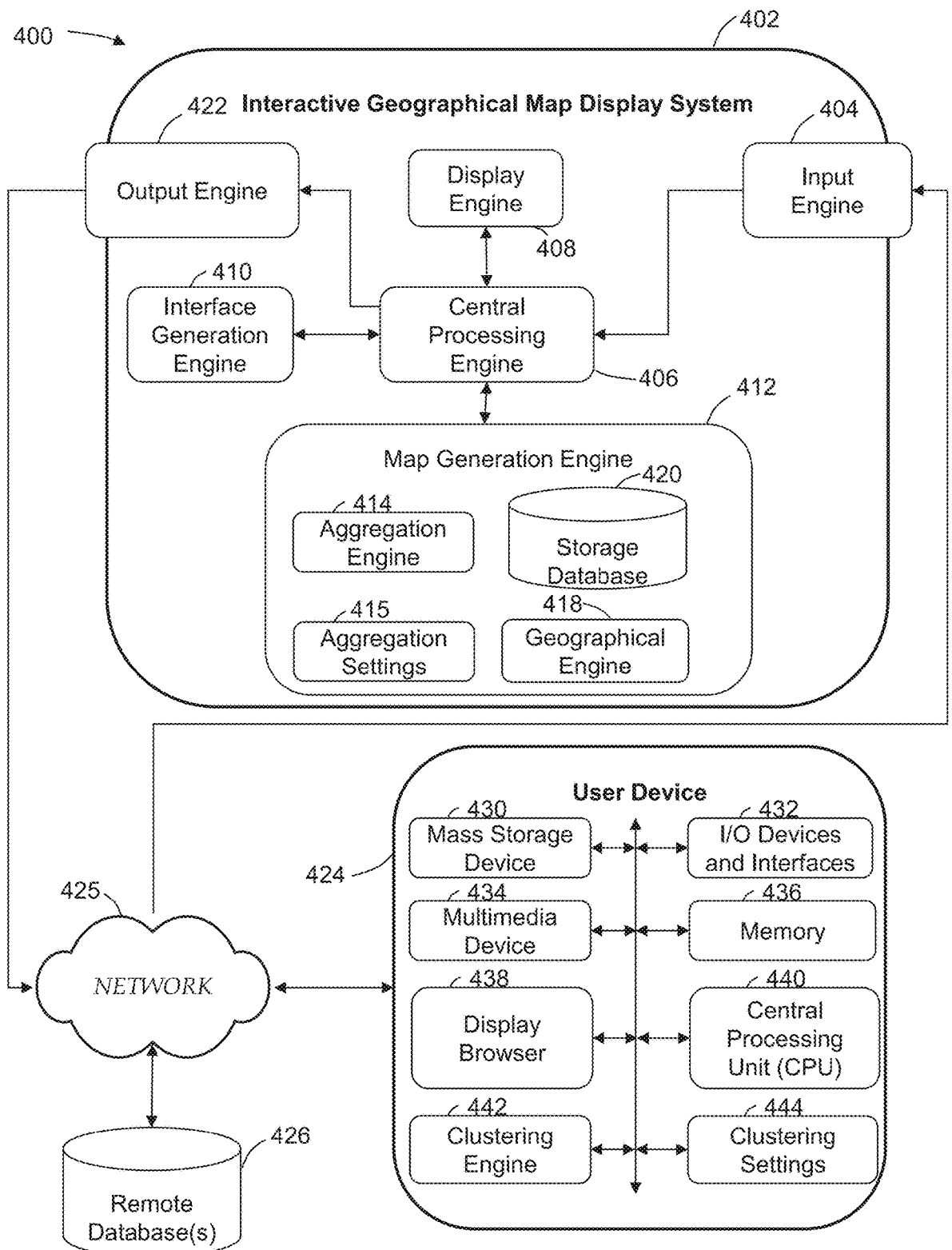
FIG. 4 illustrates an embodiment of a block diagram of the interactive geographical map display system, also illustrating how the components are in communication with each other.

FIG. 4 illustrates an embodiment of a block diagram of an interactive geographical map display system 400, also illustrating how the components are in communication with each other. The interactive geographical map display system 400 may be the same as the interactive geographical map display system described in FIG. 3 and herein. Also, the interactive geographical map display system 400 and the front-end system or user device 424 include many components. The components described herein are not meant to be exhaustive but only a sample of what components may be implemented in an interactive geographical map display system 400 and/or user device 424. Some components may be combined and others may be removed or substituted with similar components. Also, similar to FIG. 3, the discussion below and herein describes features associated with an interactive geographical map display system 402 and features associated with one or more user device(s) 424, as well as a front-end system, back-end system, and database systems. It should be appreciated that in some embodiments, the interactive geographical map display system 402 can encompass some or all of the features of the front-end system, back-end system, user device(s) 424, and database systems.

In block 404, the interactive geographical map display system 400 connects to one or more remote database(s) 426 through a network 425 (e.g. LAN, internet, etc.). The database 426 may include a set of data objects as described herein. The interactive geographical map display system 400 can obtain or receive data from the remote database 426. In some embodiments, the interactive geographical map display system 400 can connect to more than one database 426 and can obtain more than one sets of data objects. Also, the interactive geographical map display system 400 may be the same computer system 600 described in FIG. 6. In some embodiments, the data obtained and the database(s) 426 connected to can be configured or requested by a user or administrator. Also, in some embodiments, the remote database(s) 426 can be owned and/or operated by a third party and can be accessed through the use of application programming interfaces (APIs).

In block 406, the interactive geographical map display system 400 obtains and applies any preconfigured settings to the interactive geographical map (e.g. interactive geographical map 100 in FIGS. 1A-1E). In some embodiments, a user can select or dictate which settings to apply and which settings the system should prefer or default to if a conflict arises between two distinct settings. In some embodiments, a user can also provide filtering and search instructions so that the set data objects retrieved by block 404 can be further filtered down.

In block 408, the interactive geographical map display system 400 generates an interactive geographical user interface and/or generates an interactive geographical interface data useable for rendering as an interactive geographical interface. In some embodiments, the interactive geographical map display system 400 may be a remote server (e.g. front-end system), a user's computing device, or have some components on a user's computing device and additional components on a remote server, among other similar configurations. For example, in a typical configuration, relevant data and instructions can be loaded onto a browser application installed on a user's computing device. The data can be downloaded from a remote server.

In block 410, one or more users devices 424 may cause to open a browser application to view the interactive geographical map, which then, in block 412, may then cause the interactive geographical map display system 400 to determine aggregate values based on plotted locations of the data objects and the current viewport of the user device 424. Once aggregate values are calculated, the values can be transmitted by the output engine in block 422 to the user device 424 for display of the interactive geographical interface on a display browser 438. The interactive geographical map display system 400 can calculate aggregate values of the data objects in block 414 based on aggregation settings (e.g. a preconfigured aggregation threshold) in block 415 and the current viewport in block 438. Additionally, in some embodiments, certain determinations, data object sets, and/or search filtering instructions can be stored locally by the interactive geographical map display system 400 in block 420.

After block 412, and in no particular order, a user device 426 may display the interactive geographical interface determined by block 418. The device 426 may then determine clustering in block 442 based on the clustering settings in block 444, and then receive a selection of a cluster by block 432. Upon receiving a selection of a cluster, the user device 424 can depict the selected cluster with an indicator indicating the selection. Moreover, in block 432, the user device 424 can receive viewport instructions (i.e. panning or zooming), and transmit the instructions to the interactive geographical map display system 400 for further processing, while simultaneously, in some embodiments, depicting estimated clustering based on the prior determined aggregate values received from the interactive geographical map display system 400.

In the embodiment of FIG. 4, as mentioned above, the interactive geographical map display system 400 is coupled to a network 425, such as a LAN, WAN, or the Internet, for example, via a wired, wireless, or combination of wired and wireless, communication link. The network 425 communicates with various computing devices and/or other electronic devices via wired or wireless communication links. In the embodiment of FIG. 4, the network 425 is communicating with one or more interactive geographical map display systems 400 and/or one or more user devices 108.

The input device(s) 432 may comprise a keyboard, roller ball, pen and stylus, mouse, trackball, camera, voice recognition system, microphone, or pre-designated switches or buttons. The output device(s) may comprise a speaker, a display screen, a printer, or a voice synthesizer. In addition, a touch screen may act as a hybrid input/output device.

In an embodiment, a user device 424 comprises a personal computer, a laptop computer, a tablet computer, an e-reader device, a cellular phone, a smartphone, a GPS system, a gaming device, a portable computing device, a server, a computer workstation, a local area network of individual computers, an interactive kiosk, a personal digital assistant, an interactive wireless communications device, a handheld computer, an embedded computing device, an audio player, or the like. The user device 424 should also have a display browser 438. The display browser can display the interactive geographical map.

In addition to the interactive geographical map display system 400 and user devices 424 that are illustrated in FIG. 4, the network 425 may communicate with other data sources or other computing devices (e.g., remote database(s) 426). In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

In one embodiment, the interactive geographical map display system 400 comprises a mainframe computer suitable for controlling and/or communicating with large databases, performing high volume transaction processing, and generating reports from large databases. The interactive geographical map display system 400 may also include a central processing unit ("CPU") 406, which may comprise a conventional microprocessor. The interactive geographical map display system 400 may also include a memory, such as random access memory ("RAM") for temporary storage of information and/or a read only memory ("ROM") for permanent storage of information, and a mass storage device, such as a hard drive, diskette, or optical media storage device.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM, flash memory, ROM, EPROM, EEPROM, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Object-Centric Data Model

To provide a framework for the following discussion of specific systems and methods described herein, an example interactive geographical map display system 210 using an ontology 205 will now be described. This description is provided for the purpose of providing an example and is not intended to limit the techniques to the example data model, the example database system, or the example database system's use of an ontology to represent information. Also, the discussion below and herein describes features associated with an interactive geographical map display system and features associated with one or more user device(s), as well as a front-end system, back-end system, and database systems. It should be appreciated that in some embodiments, the interactive geographical map display system can encompass some or all of the features of the front-end system, back-end system, user device(s), and database systems.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
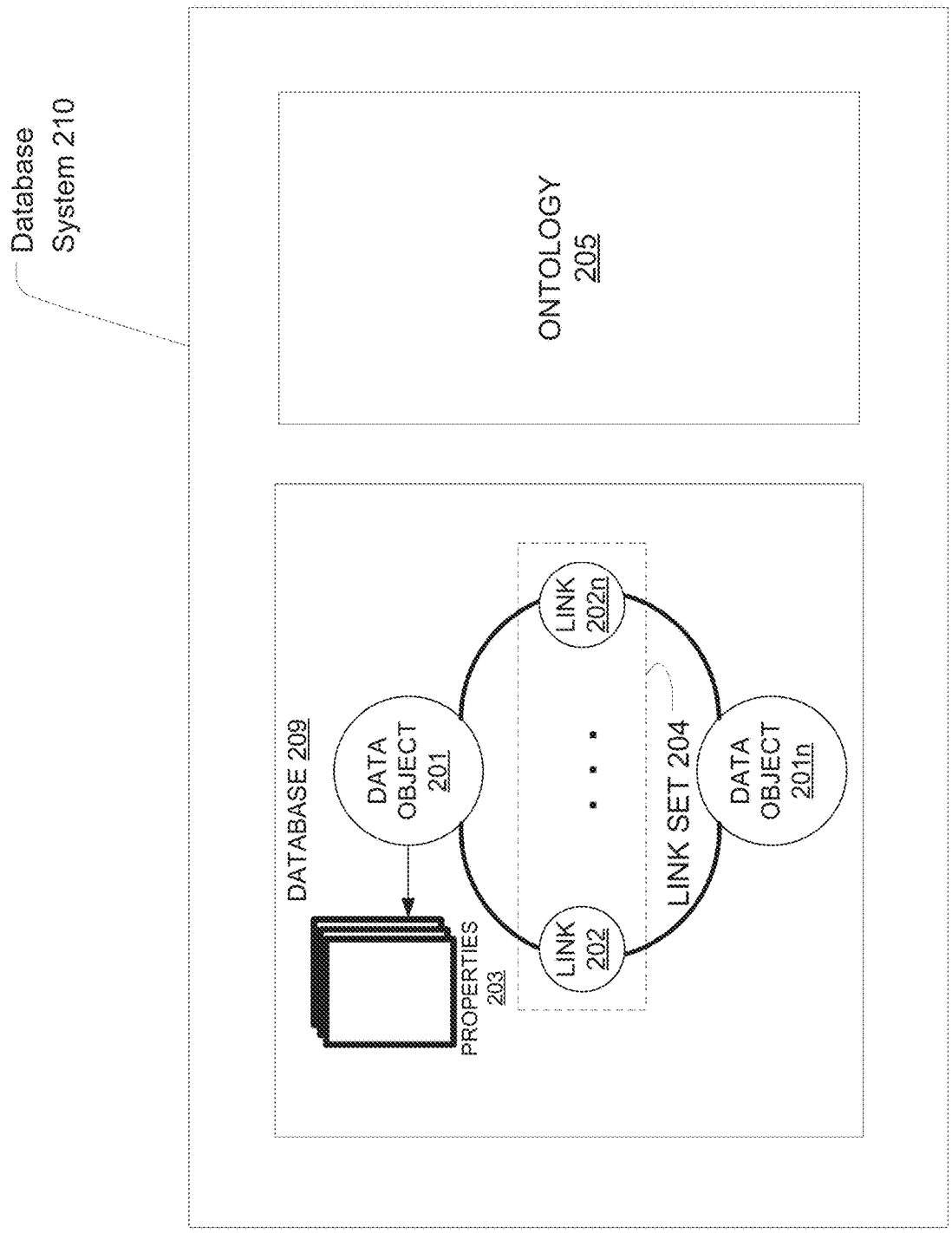
FIG. 2 illustrates one embodiment of an interactive geographical map display system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the geographical map display system.

Different types of data objects may have different property types. For example, a "Person" data object might have an "Eye Color" property type and an "Event" data object might have a "Date" property type. Each property 203 as represented by data in the geographical map display system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on 3/27/2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Advantageously, the present disclosure allows users to interact and analyze electronic data in a more analytically useful way. Graphical user interfaces allow the user to visualize otherwise obscure relationships and patterns between different data objects. The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

Figure 5:
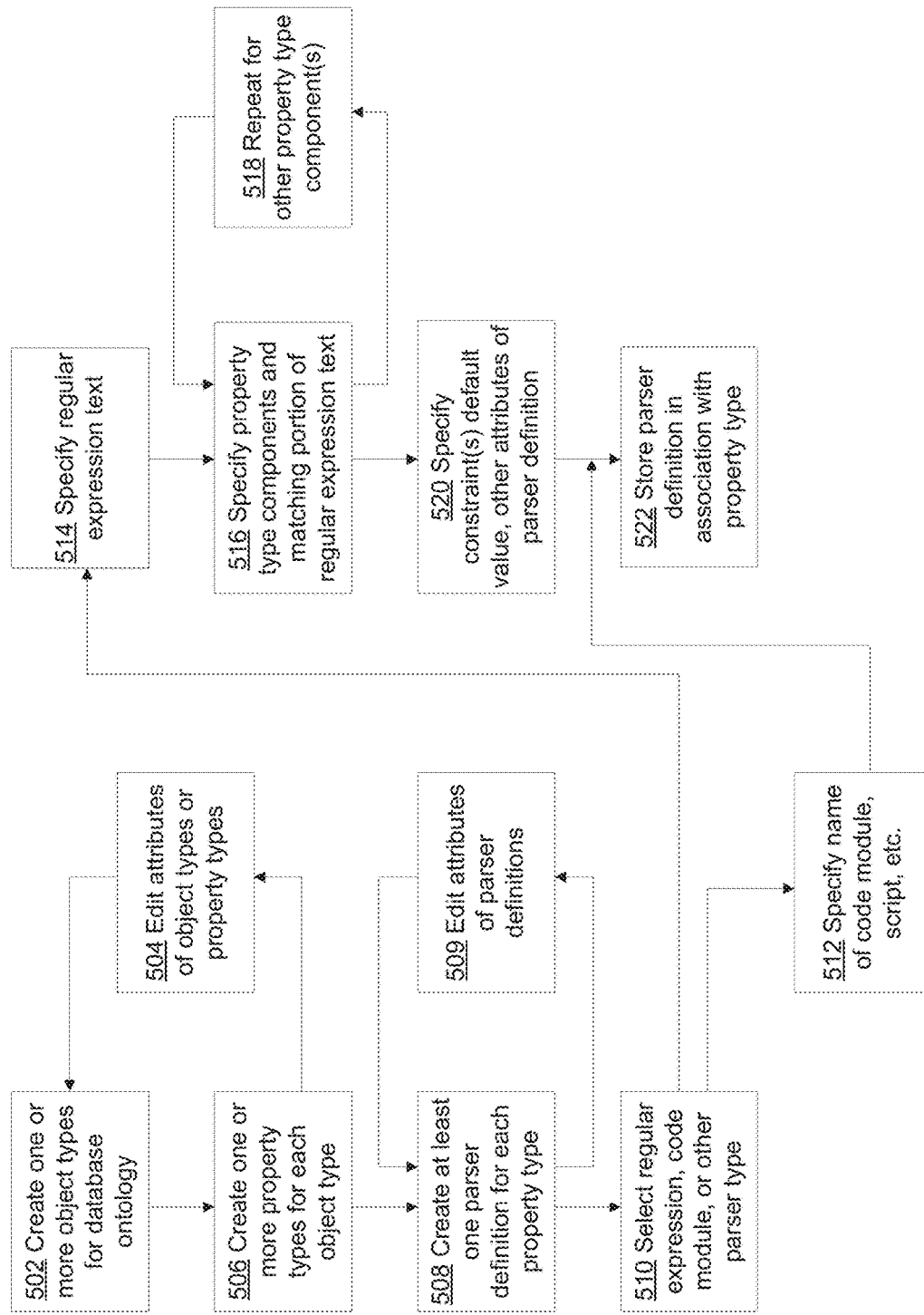
FIG. 5 illustrates defining a dynamic ontology for use in creating data in a data store.

FIG. 5 illustrates defining a dynamic ontology for use in creating data in a database. For purposes of illustrating a clear example, steps 502-509 of FIG. 5 are first described at a high level, and details of an example implementation follow the high level description.

In step 502, one or more object types are created for a database ontology. In step 506, one or more property types are created for each object type. As indicated in step 504, the attributes of object types or property types of the ontology may be edited or modified at any time.

In step 508, at least one parser definition is created for each property type. At step 509, attributes of a parser definition may be edited or modified at any time.

In an embodiment, each property type is declared to be representative of one or more object types. A property type is representative of an object type when the property type is intuitively associated with the object type. For example, a property type of "Social Security Number" may be representative of an object type "Person" but not representative of an object type "Business."

In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name:First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. Example selected attributes that can be displayed in object editor panel include an object type name (e.g., Business, Asset, etc.), a uniform resource identifier (URI) specifying a location of information defining the object type (for example, "com.business_entity_name.object.business"), and a base type of the object type, also expressed in URI format (for example, "com.business_entity_name.object.entity"). Each URI also may include a graphical icon.

In an embodiment, a user interacts with a computer to perform the following steps to define an object type. Assume for purposes of an example that the new object type is Vehicle. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Vehicle object type. The user assigns a display name of "Vehicle" to the object type.

In an embodiment, a user interacts with the computer to define a property type in a similar manner. The user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator.

In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 5, creating a parser definition for a property type at step 508 may comprise selecting a parser type such as a regular expression, code module, or other parser type. When the parser type is "code module," then a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display further comprises a Name text entry box that can receive a user-specified name for the parser definition.

When the parser type is "regular expression," steps 514-520 are performed. At step 514, regular expression text is specified. For example, when the Parser Type value of combo box is "Regular Expression," a screen display comprises an Expression Pattern text box that can receive a user entry of regular expression pattern text.

In step 516, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 520, a user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 522, the parser definition is stored in association with a property type. For example, selecting the SAVE button causes storing a parser definition based on the values entered in screen display. Parser definitions may be stored in database 209.

The approach of FIG. 5 may be implemented using other mechanisms for creating and specifying the values and elements identified in FIG. 5, and a particular GUI of is not required.

Advantageously, use of a dynamic ontology may allow a user to take advantage of an ontological data model, while not constraining himself or herself to a hard-coded ontology. Hard-coded ontologies can be overly simple (i.e. lacking detailed semantic properties, making classification difficult but limiting analysis) or overly complex (i.e. having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontologies semantic properties.

The nodes of the graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e. node list) representation.

It should be appreciated that the above system and methods can apply to varying use cases. For example, employees of an organization, cars or real estate a company is in possession of, or the like. These use cases are not exhaustive and are meant to merely provide a few examples. A person of ordinary skill in the art may find other applicable use cases for the systems and methods described.

Notification Module

In some embodiments, an alert and/or notification is automatically transmitted to the front-end system, or device operated by the entity associated with the alert and/or notification. The alert and/or notification can be transmitted at the time that the alert and/or notification is generated or at some determined time after generation of the alert and/or notification. In some embodiments, the alert can be generated upon new data being added to the back-end system, new aggregation updates are being pushed to the front-end system, or the like. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

General API Module

Various third-parties operate electronic services systems. In some instances, these systems may allow access through Application Programming Interfaces (APIs). Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name. In some embodiments, data objects, and the information associated with the data objects, can be derived from a variety of sources, including, but not limited, to the use of APIs.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

Additionally, in some implementations communications with one or more API's may be encrypted and/or authenticated. For example, public and/or private key exchanges may take place to establish authenticated and/or encrypted communications between, e.g., the system and computing systems of third-parties, to, e.g., protect user data from exposure to potentially malicious actors.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
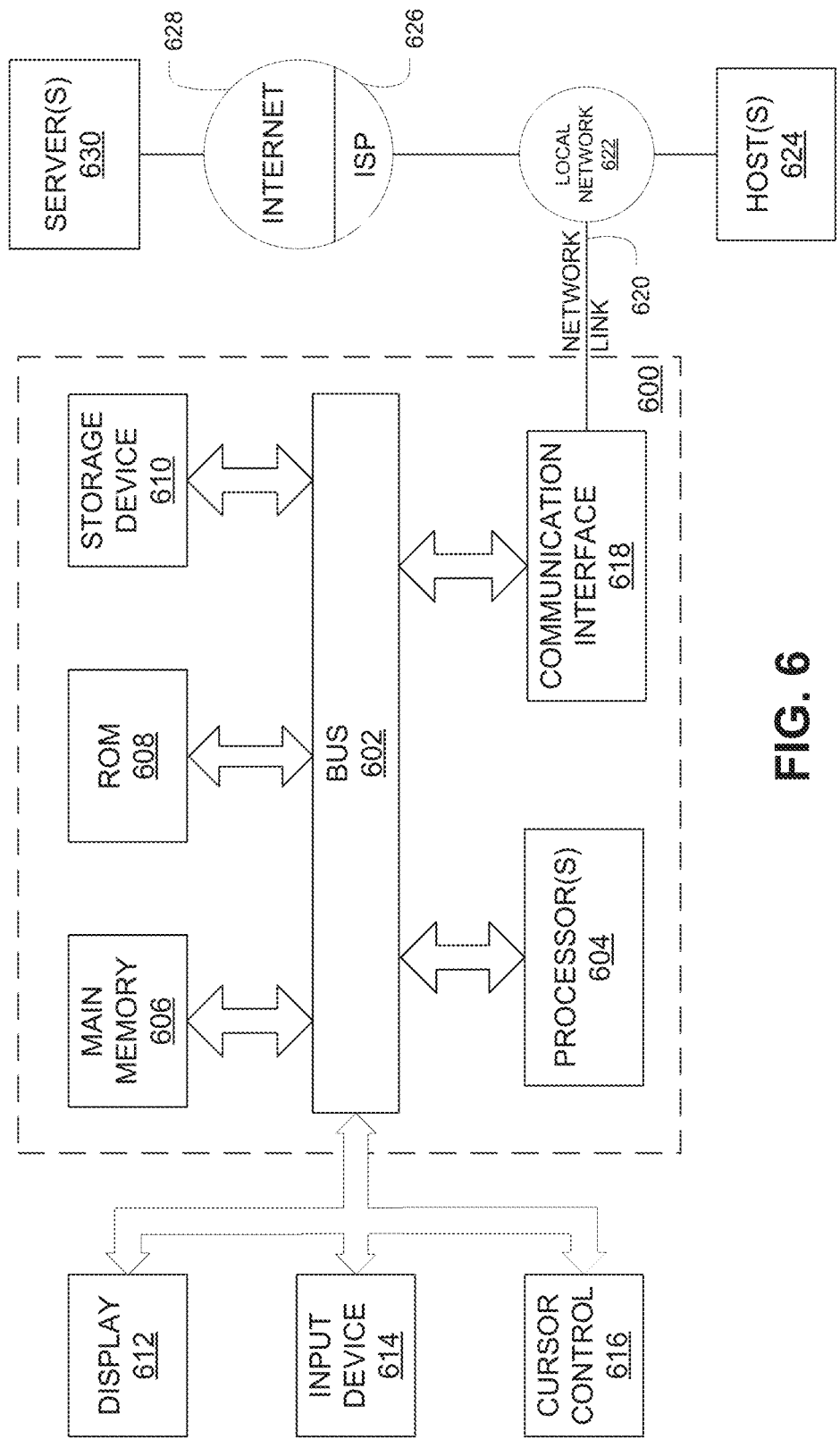
FIG. 6 illustrates a block diagram of a computer system, according to various embodiments of the present disclosure.

For example, FIG. 6 is a block diagram that illustrates a computer system 600 upon which various embodiments may be implemented. Computer system 600 may be similar, or have similar components, to the front-end system, back-end system, and/or interactive geographical map display system 400 described herein. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 808 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
    causing display of a graphical user interface comprising an interactive geographical map on a first device;
    receiving, via the graphical user interface, a first user input indicating a change from a first view of the interactive geographical map to a second view of the interactive geographical map, wherein the first view includes first data object groupings that are determined by combining first underlying data objects that geographically overlap at a geolocation data precision associated with the first view;
    transmitting, to a server, information associated with the second view;
    in response to receiving the first user input and prior to receiving a response from the server, generating and displaying an intermediate display of the second view on the first device, wherein the intermediate display includes: (1) at least a portion of the first data object groupings, and (2) first clusters that are generated by the first device based on the first data object groupings;
    while displaying the intermediate display for a first time period, receiving, from the server, one or more data files comprising second data object groupings different from the first data object groupings, wherein the second data object groupings are determined by combining second underlying data objects that geographically overlap at a geolocation data precision associated with the second view; and
    in response to receiving the one or more data files comprising the second data object groupings, automatically generating and displaying a final display of the second view on the first device replacing the intermediate display, wherein the final display includes: (1) at least a portion of the second data object groupings in place of the at least a portion of the first data object groupings, and (2) second clusters in place of the first clusters and that are generated by the first device based on the at least a portion of the second data object groupings.

2. The computer-implemented method of claim 1, wherein the first view includes the first data object groupings displayed in the interactive geographical map, and wherein the intermediate display includes at least the portion of the first data object groupings displayed in the interactive geographical map.

3. The computer-implemented method of claim 1, wherein the final display of the second view includes at least a portion of the second data object groupings displayed in the interactive geographical map.

4. The computer-implemented method of claim 1, wherein said transmitting of the information and said generating and displaying the intermediate display are performed in response to receiving the first user input.

5. The computer-implemented method of claim 1, wherein said causing the final display is performed in response to said receiving the one or more data files.

6. The computer-implemented method of claim 1, wherein the geolocation data precision associated with the second view is based on a preconfigured target quantity of data object groupings to be displayed for the second view.

7. The computer-implemented method of claim 1, wherein the change from the first view to the second view includes one or more of: changing a zoom level of the interactive geographical map; or panning of the interactive geographical map.

8. The computer-implemented method of claim 1, wherein the one or more data files also includes information comprising a quantity of data objects in each of the second data object groupings.

9. The computer-implemented method of claim 1, wherein the geolocation data precision includes adding, removing, or rounding the geolocation data associated with the one or more underlying data objects.

10. The computer-implemented method of claim 1, wherein each data object grouping of the first data object groupings represents a portion of a first set of data objects associated with respective geolocation data that overlap at a particular geolocation.

11. A system comprising:
    a computer readable storage medium having program instructions embodied therewith; and
    one or more processors configured to execute the program instructions to cause the system to:
        causing display of a graphical user interface comprising an interactive geographical map on a first device;
        receiving, via the graphical user interface, a user input indicating a change from a first view of the interactive geographical map to a second view of the interactive geographical map, wherein the first view includes first data object groupings that are determined by combining first underlying data objects that geographically overlap at a geolocation data precision associated with the first view;
        transmitting, to a server, information associated with the second view;
        in response to receiving the user input and prior to receiving a response from the server, generating and displaying an intermediate display of the second view on the first device, wherein the intermediate display includes: (1) at least a portion of the first data object groupings, and (2) first clusters that are generated by the first device based on the first data object groupings;
        while displaying the intermediate display for a first time period, receiving, from the server, one or more data files comprising second data object groupings different from the first data object groupings, wherein the second data object groupings are determined by combining second underlying data objects that geographically overlap at a geolocation data precision associated with the second view; and
        in response to receiving the one or more data files comprising the second data object groupings, automatically generating and displaying a final display of the second view on the first device replacing the intermediate display, wherein the final display includes: (1) at least a portion of the second data object groupings in place of the at least a portion of the first data object groupings, and (2) second clusters in place of the first clusters and that are generated by the first device based on the at least a portion of the second data object groupings.

12. The system of claim 11, wherein the first view includes the first data object groupings displayed in the interactive geographical map, and wherein the intermediate display includes at least the portion of the first data object groupings displayed in the interactive geographical map.

13. The system of claim 11, wherein the final display of the second view includes at least a portion of the second data object groupings displayed in the interactive geographical map.

14. The system of claim 11, wherein said transmitting of the information and said generating and displaying the intermediate display are performed in response to receiving the user input.

15. The system of claim 11, wherein the geolocation data precision associated with the second view is based on a preconfigured target quantity of data object groupings to be displayed for the second view.

16. The system of claim 11, wherein the change from the first view to the second view includes one or more of: changing a zoom level of the interactive geographical map; or panning of the interactive geographical map.

17. The system of claim 11, wherein the geolocation data precision includes adding, removing, or rounding the geolocation data associated with the one or more underlying data objects.

18. The system of claim 11, wherein each data object grouping of the first data object groupings represents a portion of a first set of data objects associated with respective geolocation data that overlap at a particular geolocation.

\* \* \* \* \*